United States Patent
Gawarecki

(10) Patent No.: US 9,131,797 B2
(45) Date of Patent: Sep. 15, 2015

(54) METHOD AND DEVICE FOR PRODUCING FILTER INSERTS

(75) Inventor: Herbert Gawarecki, Haltern am See (DE)

(73) Assignee: Melitta Europa GmbH & Co. KG, Minden (DE)

( * ) Notice: Subject to any disclaimer, the term of this patent is extended or adjusted under 35 U.S.C. 154(b) by 915 days.

(21) Appl. No.: 12/713,575

(22) Filed: Feb. 26, 2010

(65) Prior Publication Data

US 2010/0216618 A1    Aug. 26, 2010

(30) Foreign Application Priority Data

Feb. 26, 2009   (EP) .................................... 09002757

(51) Int. Cl.

| | |
|---|---|
| *B31B 1/88* | (2006.01) |
| *B31B 1/14* | (2006.01) |
| *B31B 1/60* | (2006.01) |
| *B31B 1/26* | (2006.01) |
| *A47J 31/08* | (2006.01) |
| *B31D 1/00* | (2006.01) |
| *B31F 1/07* | (2006.01) |
| *B31F 5/02* | (2006.01) |
| *A47J 31/06* | (2006.01) |

(52) U.S. Cl.
CPC ............... *A47J 31/08* (2013.01); *B31D 1/0006* (2013.01); *B31F 1/07* (2013.01); *B31F 5/022* (2013.01); *A47J 2031/0694* (2013.01); *B31F 2201/0728* (2013.01); *B31F 2201/0733* (2013.01); *B31F 2201/0761* (2013.01)

(58) Field of Classification Search
CPC ............... B31B 1/14; B31B 1/26; B31B 1/60; B31B 1/88; B31B 25/00; B31B 2237/25; B31B 2237/50; B31B 2237/403; B65B 29/02; B31F 1/07; B31F 2201/0761; B31F 2201/0733; B31F 2201/0728; A47J 31/06; A47J 31/08; B41F 23/04; B01D 39/00; B01D 39/18; B29C 59/04; B29C 65/78; B32B 38/06
USPC ......... 493/188, 243, 186, 239, 244, 267, 405, 493/355, 396; 426/77–78; 210/500.1, 504, 210/497.3; 101/3.1, 5, 488
See application file for complete search history.

(56) References Cited

U.S. PATENT DOCUMENTS

| | | | | |
|---|---|---|---|---|
| 3,444,791 | A * | 5/1969 | Honsel | 493/357 |
| 4,718,883 | A * | 1/1988 | Schmidt | 493/328 |
| 5,863,431 | A * | 1/1999 | Salzburg | 210/474 |
| 6,368,539 | B1 * | 4/2002 | Greenfield et al. | 264/284 |

(Continued)

FOREIGN PATENT DOCUMENTS

| | | | | |
|---|---|---|---|---|
| BE | 710532 | A * | 6/1968 | ............. A47J 31/08 |
| DE | 7510852 | U | 10/1976 | |

(Continued)

*Primary Examiner* — Gloria R Weeks
*Assistant Examiner* — Justin Citrin
(74) *Attorney, Agent, or Firm* — Roberts Mlotkowski Safran & Cole, P.C.; David S. Safran

(57) ABSTRACT

A method and a device for producing filter inserts (1), in particular filter inserts (1) for preparing a coffee or tea filtrate, including the continuous folding (A) of a filter paper sheet (2) into a double layer (3), partially binding (B) the double layer (3) to a plurality of interconnected filter inserts (1) using at least one stamped seam (4) and separating (D) the interconnected filter inserts (1) from the filter paper sheet (2). The filter inserts (1) are provided with a label (5) after folding (A).

10 Claims, 6 Drawing Sheets

(56) References Cited

U.S. PATENT DOCUMENTS

| | | | |
|---|---|---|---|
| 2001/0013281 A1* | 8/2001 | Dolfel et al. | 101/3.1 |
| 2003/0113410 A1* | 6/2003 | Lohrey et al. | 426/77 |
| 2008/0245727 A1* | 10/2008 | Muller | 210/506 |

FOREIGN PATENT DOCUMENTS

| | | | | |
|---|---|---|---|---|
| DE | 80 21 424.0 U1 | 3/1981 | | |
| DE | 91 03 831.6 U1 | 6/1991 | | |
| DE | 296 07 368 U1 | 7/1996 | | |
| DE | 196 27 526 A1 | 1/1998 | | |
| DE | 299 19 609 U1 | 1/2000 | | |
| EP | 0 062 216 B1 | 6/1986 | | |
| EP | 62216 B1 * | 6/1986 | | A47J 31/08 |
| EP | 1 172 054 A1 | 1/2002 | | |
| WO | 00/08987 A1 | 2/2000 | | |

* cited by examiner

METHOD AND DEVICE FOR PRODUCING FILTER INSERTS

BACKGROUND OF THE INVENTION

1. Field of Invention

The invention relates to a method and a device for producing filter inserts, in particular filter inserts for preparing a coffee or tea filtrate. The method includes the continuous folding of a filter paper sheet into a double layer, partially binding the double layer to a plurality of interconnected filter inserts using at least one stamped seam and separating the interconnected filter inserts from the filter paper sheet. The device is suitable for carrying out the method and includes a folding device for folding the filter paper sheet into a double layer, a first stamping device for partially binding the double layer, a second stamping device for labeling the filter inserts and a cutting device for separating the filter inserts from the double layer.

2. Description of Related Art

In the prior art, many methods and devices for producing filter inserts are known, in particular for coffee and tea filters. The method sequence is normally provided so that a filter paper sheet is first folded into a double layer and this double layer is then partially provided with stamped seams, wherein the stamped seams at least partially define the outer contour of the filter insert. Then, the stamped filter inserts are removed from the filter paper sheet and further processed. If a label or, for example, a level indicator is provided on the filter insert, the stamping of the label or the level indicator occurs before the folding of the filter paper sheet in the single-ply filter paper sheet. This process-optimized arrangement, i.e., providing the stamping of a label before folding, has the disadvantage that a lot of space is required for the arrangement of the stamping equipment. The stamped label can only be identified on one side of the filter insert in this arrangement, so that, in order to be read, it must be correctly positioned. Furthermore, this arrangement has the disadvantage that stamping often causes a local weakness in the material, which can lead to the material, for example, being damaged locally and the production process consequently having to be stopped.

SUMMARY OF THE INVENTION

A primary object of the present invention is, thus, to provide a method and a device for producing filter inserts, in which the problems known from the prior art are prevented—at least partially—and damage to the filter paper sheet is reliably prevented.

The above object is met according to the invention with a method of the type mentioned above, in which the filter insert is provided with a label after being folded. This labeling of the filter insert, for example, with a label or a fill level indicator after folding has the advantage that the label can be applied without limitation on both sides of the filter insert, since the filter paper sheet is already double-layered after folding, and thus, is easily handled in a single process step from both sides, i.e., can be labeled. Since the filter paper sheet is double-layered, additionally, it is not as heavily stressed by the conveyor and cannot be as easily damaged. Furthermore, this arrangement leads to a reduction of the required space, since all units for handling and processing the double-layered filter paper sheet are provided compactly together.

The space for the working and processing unit is additionally reduced in that only one filter paper sheet having half the width—the double layer—has to be processed, since the filter paper sheet is already folded by the folding. Specifically, in a unit for applying the label, only one filter paper sheet having half the width has to be processed, which leads to the unit having a smaller size.

A preferred embodiment of the method provides that the labeling of the filter insert occurs simultaneously with their removal from the filter paper sheet. This has the advantage that two process steps can be combined, and thus, the process is simplified. Alternatively, the labeling takes place before the removal of the filter insert. Both versions have the advantage that the individual filter paper inserts can be transported better during working and processing, since they are joined to one another through the filter paper sheet. Additionally, it is possible that the labeling of the filter inserts, for example, with a symbol or a fill level line, first occurs after separation from the filter paper sheet so that each filter insert, for example, in a discontinuous working step, is individually provided with a label.

The method is characterized in a preferred embodiment in that a symbol or a fill level indicator, for example, as label is immediately stamped into the material of the filter insert. Stamping the label immediately into the material of the filter insert has the advantage that, in respect to the label, comparably few hygiene regulations have to be observed since no additives, e.g., dyes, are used. Here, labeling is preferably of a character and/or a symbol, for example, a company logo. It has been seen to be advantageous to provide a label in the form of a fill level line on the filter insert so that, during use, the user has a filling guideline for orientation. Additionally, when the label is stamped, a further advantage of the method arrangement according to the invention—the arrangement with labeling after folding—results, namely that the stamping label is not damaged by a folding step or weakened in its contour since the folding step has already taken place.

According to a further advantageous embodiment of the method according to the invention, it is provided that the stamping of the label reaches both layers of the double layer so that the labeling is visible from both sides of the filter insert. Here, it is particularly preferred that the stamped label, for example, a company logo, is at least partially stamped properly oriented as well as mirror-imaged. This results in the advantage that the company logo is arranged properly oriented on each side of the filter wall or filter walls and can be read or recognized.

A particularly advantageous embodiment of the course of the method has been seen in initially continuously folding the filter paper sheet into a double layer. Here, the fold is provided essentially in the middle of the lateral width of the filter paper sheet so that an exact overlap of both halves of the filter paper sheet results during folding. The resulting double layer is then subsequently joined into a plurality of interconnected filter inserts using a stamping step with at least one stamped seam per filter insert. The individual layers of the double layer of the filter paper sheet are partially interlocking and are firmly connected to one another here, whereby the contour of the filter insert is already essentially defined. Then, each individual filter insert—which, however, is still connected to the filter paper sheet—is provided with a stamped label, which extends over both layers of the filter insert but does not bind the double layer. The labels, i.e., for example, lines for a fill level indicator, are thus recognized from both sides of the filter insert. Then, the individual filter insert is removed from the filter paper sheet and e.g., stacked and packaged. The separation from the filter paper sheet can occur by cutting, punching or any other separation step.

A further advantageous embodiment of the course of the method provides that the filter paper sheet is initially continuously folded into a double layer and the resulting double layer is subsequently provided with a stamped, non-binding label. The term "non-binding" means that despite the stamp extending over both layers of the double layer, both filter paper layers are not bound together. After labeling, the double layer is at least partially connected with at least one binding stamp seam so that a plurality of interconnected filter inserts is created. These filter inserts are then separated from the filter paper sheet or the double layer by a cutting roller and further processed. The difference to the previous method sequence involves the fact that, in the stamping, non-binding of the label occurs before the stamping of the stamped seam partially binding the double layer.

The stamping of the seam as well as the stamping of the label occurs according to a further preferred embodiment of the method, respectively, by means of a stamping roller, which, for example, presses onto a moving or non-moving surface. The surface, here, is designed in such a manner that a non-binding stamp for labeling and a binding stamp for the stamped seam can be produced. It has been seen to be very advantageous for both the stamping of the seam as well as for the stamping of the label to provide a pair of stamping rollers since an uninterrupted stamping step along the entire filter paper sheet is possible due to the continuous movement of both rollers.

In order to further reduce the required space and for simplifying the method overall, it is particularly preferred to execute the stamping of the stamped seam, i.e., the binding of both filter layers, and the stamping of the label in a single process step. For this process step, only one stamping roller and one corresponding counter plate are provided, wherein not only is the seam stamped as interlocking connection between the two filter layers, but labeling is also carried out without the filter paper layers being bound by labeling. The combining of two method steps into one method step leads to a substantial reduction of the amount of work. It has been seen to be of particular advantage to provide a single pair of stamping rollers for this method step, which carries out the binding stamping of the stamped seam as well as the non-binding stamping of the label in one method step.

The method according to the invention is characterized in a particularly preferred variation in that the separation of the individual filter inserts from the filter paper sheet occurs using a cutting roller, which continuously removes the individual filter inserts from the filter paper sheet. The remaining waste material is removed from the process. It has been seen to be very advantageous to provide a pair of cutting rollers for the separation step, in particular wherein grooves, for example, are provided on the first cutting roller, into which, for example, the blades of the second cutting roller engage and thereby sever the filter paper layers. Furthermore, it is alternatively provided that the first cutting roller has no profile.

The production of filter inserts from one filter paper sheet is often a continuous process, which is why folding the filter paper sheet into a double layer should also be designed as a continuous process. It has been seen to be particularly advantageous to implement the folding process by leading the filter paper sheet over a folding triangle, whereby it is possible to evenly and continuously fold the filter paper sheet—essentially along its longitudinal midline. The folding triangle or the folding area is correspondingly designed here to be so long that damage to the filter paper sheet during the folding process is reliably avoided. The sides of the filter paper sheet are turned respectively by 90° during the folding step. So that this turning does not lead to a tearing of the filter paper sheet, the change of angle is to occur slowly over a correspondingly long distance.

After folding, the filter paper sheet is folded in such a manner that a double layer is created. After the folding step, the double layer is preferably led by at least one converging roller in such a manner that creases in the filter paper sheet are prevented. As an alternative to the converging roller, a converging rod is provided, which ensures the corresponding leading of the double layer. It is particularly preferred to provide converging rollers or converging rods in pairs so that the filter paper sheet is led between both converging rollers or converging rods and even wear is ensured. It is preferred to turn the double layer, after leading it through the converging roller or converging rod, essentially by 90° by means of a deflection roller, so that the further processing of the filter paper sheet takes place, in particular, in a horizontal arrangement.

A preferred design of the method provides that the stamping of the label takes place in a stamping step, in which a punch and a counterpunch interact. So that both filter paper layers are not bound to one another by the stamping of the label, it has been seen to be advantageous when the stamping of the label is created by a counterpunch and an elastic counter plate since a stamping together, i.e., binding, of both filter paper layers is reliably prevented by this design of the stamping unit for labeling, since the elastic counter plate forms only an insufficient abutment for a binding stamp. Here, it is preferably provided that the elastic counter plate is formed of silicone rubber, of natural rubber or, for example, of wood so that, at any rate, an elastic abutment is ensured in the stamping step.

A final particularly preferred embodiment of the method according to the invention provides that the punch and counterpunch are implemented in the form of a roller. This ensures that the stamping of the label can also occur in a continuous process. Here, it is particularly provided that the punch roller is made of an elastic material on the surface area, wherein, in particular, silicone rubber or natural rubber or also wood are provided for this. For the stamping step for labeling, the counterpunch roller pushes its surface structure or the counterpunch stamp against the punch roller having an elastic surface and creates, here, a marking but not binding stamp on both filter paper layers.

It has been seen to be very advantageous that the elastic section of the punch roller only extends over a defined partial section of the surface of the punch roller, so that the rest of the section, for example, can be provided for a stamping, i.e., a binding stamp. This design allows, in particular, carrying out a binding stamp and a non-binding, i.e., only marking stamp in one working step using one pair of stamping rollers. A preferred design provides that only the punch or only the counterpunch is implemented in the form of a roller and respectively presses against a moving, but flat counter section or this counter section pushes against the roller, whereby either the surface of the roller is elastic and the counter plate has counterpunches or vice versa.

The device according to the invention is particularly suited for carrying out the method according to the invention, which serves to produce filter inserts from a filter paper sheet and has a folding device for folding the filter paper sheet into a double layer, a first stamping device for partially binding the double layer, a second stamping device for labeling the filter inserts and a cutting device for separating the filter inserts from the double layer. The device is constructed in such a manner that a folding device is provided as a first unit that processes the filter paper sheet, with which the filter paper sheet can be folded into a double layer at about half of its width. A first stamping device—first pair of stamping rollers—is arranged after the folding device, which is designed so that both layers of the double layer can be bound together by it with a film stamped seam. The stamped seam essentially defines the outer contour of the filter insert to be produced. A second stamping device—second pair of stamping rollers—is arranged after the binding pair of stamping rollers, with which the filters can be labeled by a stamp, wherein the stamping rollers of the second pair of stamping rollers are designed so that no binding between both layers of the double layer occurs by the stamping of the label. A cutting device— pair of cutting rollers—is arranged as the last unit of the device according to the invention, with which the filter inserts bound and labeled by the device can be removed from the double layer or the filter paper sheet.

A further device according to the invention for producing filter inserts or for carrying out the method according to the invention is designed in such a manner that it has a folding device, a single pair of stamping rollers and a pair of cutting rollers, wherein the pair of stamping rollers is designed so that a binding stamped seam and a non-binding label can be stamped in a single method step. This device according to the invention has the advantage that only one pair of stamping rollers is necessary to bind and to label the filter inserts, whereby a reduction of the required space is achieved.

It is provided in an additional device according to the invention having a folding device, a pair of stamping rollers and a pair of cutting rollers that the device is designed in such a manner that the pair of cutting rollers implements a non-binding stamped label of the filter insert simultaneously with the separation step. For this, not only, e.g., blades, but additional projections for the stamping of the label and a corresponding recess on the counter roller are provided.

In addition to the method and the device, the invention additionally includes a punch roller, which is wherein is has an elastic surface section for stamping the label and a rigid surface section for stamping the stamped seams. The elastic surface section for stamping the labels is necessary in that the stamping counterpunch interacts with the elastic surface section, and thus, the filter paper sheet placed between counterpunch and elastic surface section is provided with a labeling stamp, however, is not bound. The rigid surface section in the punch roller with corresponding projections and/or recesses for stamping of stamped seams is provided for corresponding to the projections and/or recesses on the counterpunch roller in such a manner that firm stamped seams are created and both layers of the double layer—at least partially—are bound to one another. The interaction between counterpunch stamp and elastic counter section thus leads to a non-binding stamp, while the interaction of two essentially non-elastic surface sections having projections and/or recesses leads to a binding stamp.

In detail, there is a plurality of possibilities for designing and further developing the method according to the invention and the device according to the invention as will be apparent from the following description of embodiments in connection with the accompanying drawings.

DETAILED DESCRIPTION OF THE INVENTION

Figure 1:
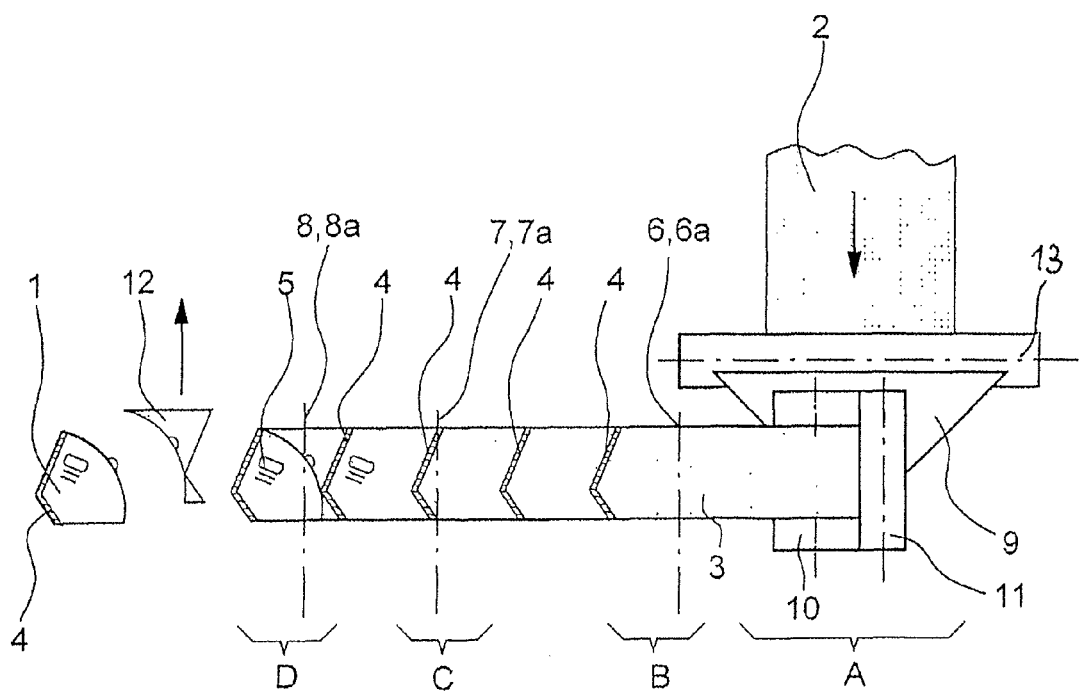
FIG. 1 shows a device for carrying out the method according to the invention in a rear view.

FIG. 1 shows a device with which the method according to the invention can be carried out. The method according to the invention for producing filter inserts 1 includes the method steps of A continuous folding of a filter paper sheet 2 into a double layer 3, B partially binding the double layer 3 to a plurality of interconnected filter inserts 1 using at least one stamped seam 4, C labeling the filter inserts 1 with a label 5 and D separating the filter inserts 1 from the filter paper sheet 2 or the filter inserts 1 from the double layer 3. The device shown in FIG. 1 has a first stamping roller 6 for binding the double layer 3 with a stamped seam 4, a second stamping roller 7 for labeling with a label 5, a cutting roller 8, a folding triangle 9, a deflection roller 10 and a converging roller 11. The first stamping roller 6 for the stamped seam 4, the second stamping roller 7 for the label 5, the cutting roller 8 and the converging roller 11 are each provided as a pair so that, respectively, a first pair of stamping rollers 6a, a second pair of stamping rollers 7a, a pair of cutting rollers 8a and a pair of converging rollers 11a result. The first stamping roller 6 for the stamped seam 4, the second stamping roller 7 for the label 5 and the cutting roller 8 are only shown in FIG. 1 as midlines of the corresponding roller.

In the device according to FIG. 1 for preferred execution of the method, the filter paper sheet 2 is led from bottom to top over the folding triangle 9, whereby the folding of the filter paper sheet 2 into a double layer 3 is the result. The filter paper sheet 2 is folded, here, to about half of its width, so that the double layer 3 is about half the width of the filter paper sheet 2. After folding by the folding triangle 9, the resulting double layer 3 is led above the folding triangle 9 by a pair of converging rollers 11a comprised of two converging rollers 11. The implementation of the pair of converging rollers 11a prevents damage to the filter paper sheet 1 or the double layer 3. Subsequently, the double layer 3 is turned by a deflection roller 10 by about 90° from a vertical movement to a horizontal movement. Then, the double layer 3 enters between the pair of stamping rollers 6a where the partial binding B of the double layer 3 occurs with a stamped seam 4. The stamped seam 4 makes for a firm binding between both layers of the double layer 3 and defines the outer edges of the filter insert 1. The double layer 3 with the stamped seams 4 is then led between the pair of stamping rollers 7a, where the labeling is produced with a stamped label 5. The label 5 is stamped into both layers of the double layer 3 without binding both of the layers. Then, the separating of the filter insert 1 from the filter paper sheet 2 occurs using a pair of cutting rollers 8a. After removing the filter inserts 1 from the filter paper sheet 2, a plurality of individual filter inserts 1 are created along with a corresponding amount of waste material 12. The waste material 12 is removed from the process and utilized, when applicable.

Figure 2:
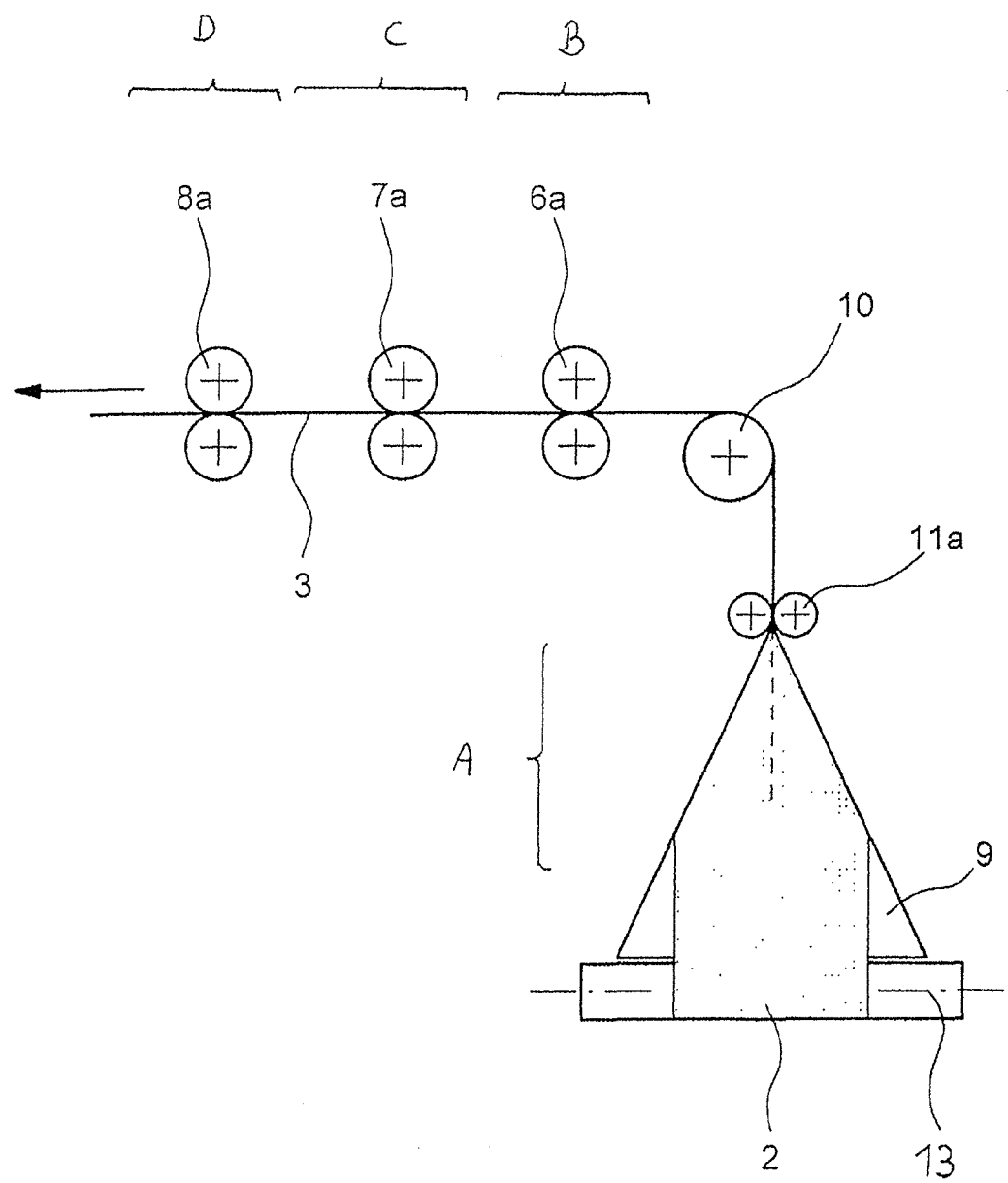
FIG. 2 shows the device according to FIG. 1 for carrying out the method according to the invention in a front view.

FIG. 2 shows the device according to FIG. 1 for carrying out the method according to the invention in a rear view. The filter paper sheet 2 is led from bottom to top over the folding triangle 9, whereby the folding A of the filter paper sheet 2 results in a double layer 3. In the upper section of the folding triangle 9, the double layer 3 is incorporated by a pair of converging rollers 11a and then turned by a deflection roller 10 by about 90°, so that it is possible to further process the double layer 3 horizontally. Then, the binding produces a stamped seam 4 using the first pair of stamping rollers 6a, the labeling of the filter insert with a stamped label 5 by the second pair of stamping rollers 7a and the separation of the filter inserts from the double layer 3 using the pair of cutting rollers 8a.

Figure 2A:
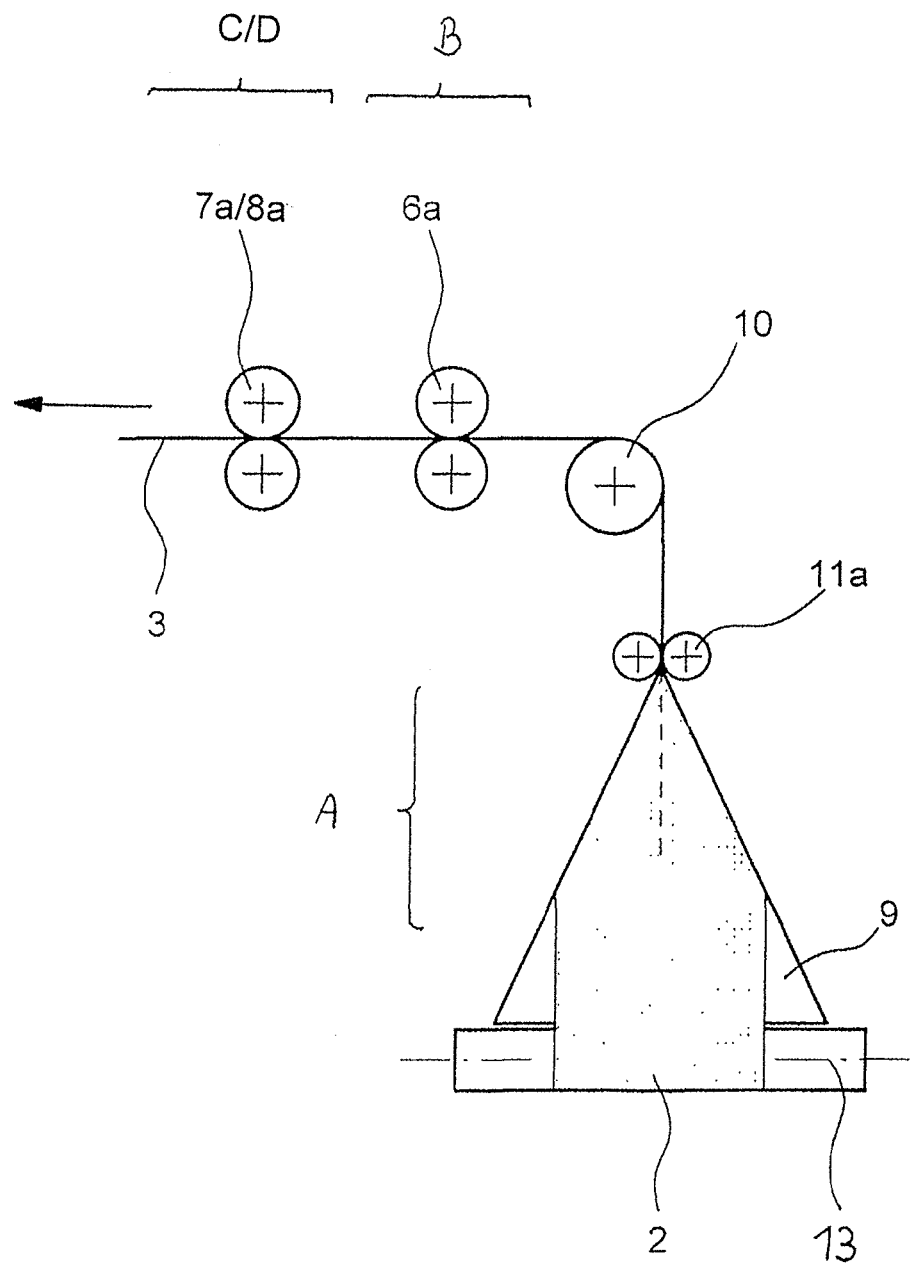
FIG. 2A shows a modified device for carrying out an alternative method according to the invention in a front view, FIG. 3 device according to FIGS. 1 & 2 for carrying out the method according to the invention in a side view.
Figure 4A:
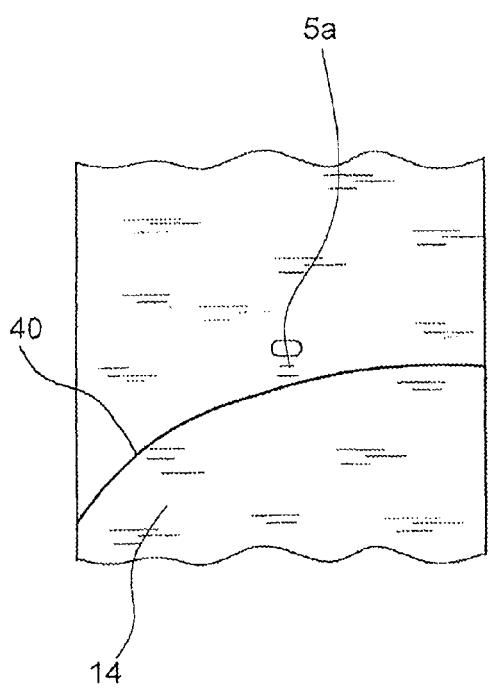
FIGS. 4A and 5A correspond to FIGS. 4 & 5, but of a modified embodiment.
Figure 5A:
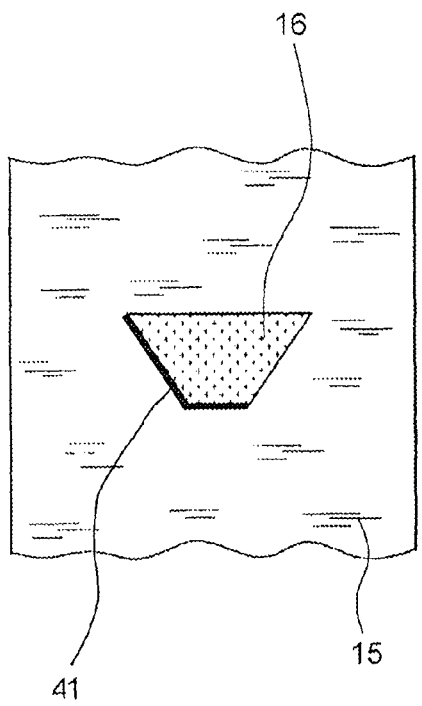

It is provided that, in an additional device according to the invention having a folding device 9, a pair of stamping rollers 6a and a pair of cutting rollers 8a as in FIG. 2, the device is designed in such a manner that the pair of cutting rollers 8a implements a non-binding stamped label into the filter insert simultaneously with the separation step. For this, not only, e.g., blades, but additional projections for the stamping of the label and a corresponding recess on the counter roller are provided such that the functions of the second pair of stamping rollers 7a a is combined with that of the cutting rollers 8a in a single pair of cutting and stamping rollers 8/7a as shown in FIGS. 2A, 4A & 5A. As shown in FIG. 4A, a cutting edge 40 is provided for producing the arcuate edge shown on the right side of separated filter insert 1 in FIG. 1 and as shown in FIG. 5A, an angular cutting edge 41 is provided for producing the angular edge shown on the left side of separated filter insert 1 in FIG. 1.

Figure 3:
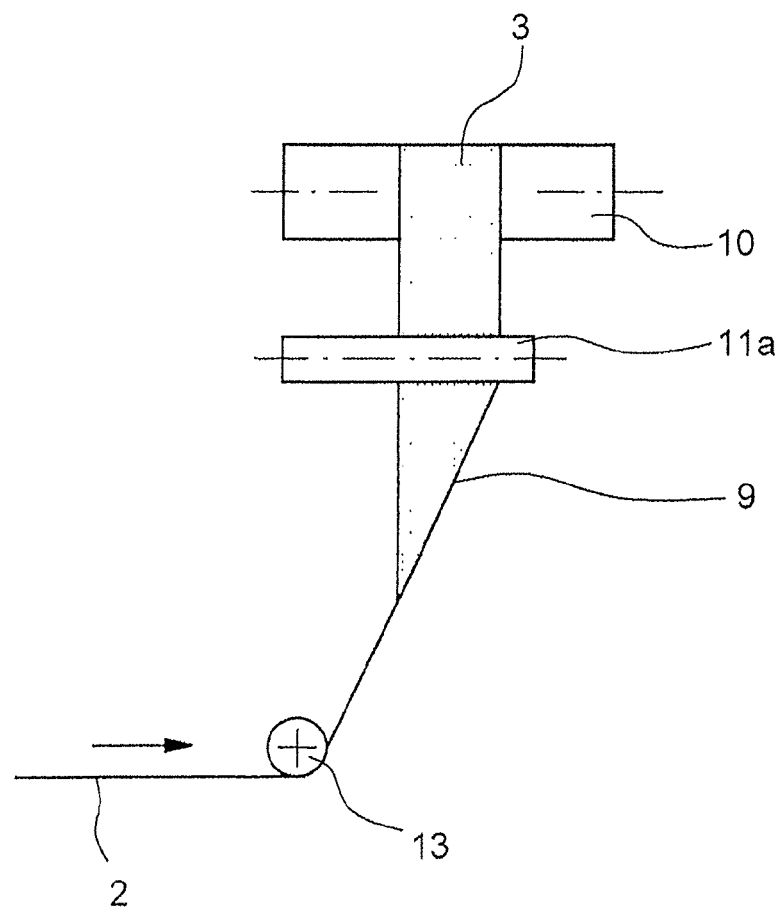

FIG. 3 shows the device according to FIGS. 1 & 2 for carrying out the method according to the invention in a side view. In this design, the horizontally led filter paper sheet 2 is initially turned by a second deflection roller 13 to a vertical course and, is led from bottom to top over the folding triangle 9 so that the filter paper sheet 2 is folded into a double layer 3. Then, the double layer 3 is led by a pair of converging rollers 11a and turned by a deflection roller 10, so that further processing can occur horizontally.

Figures 4, 5:
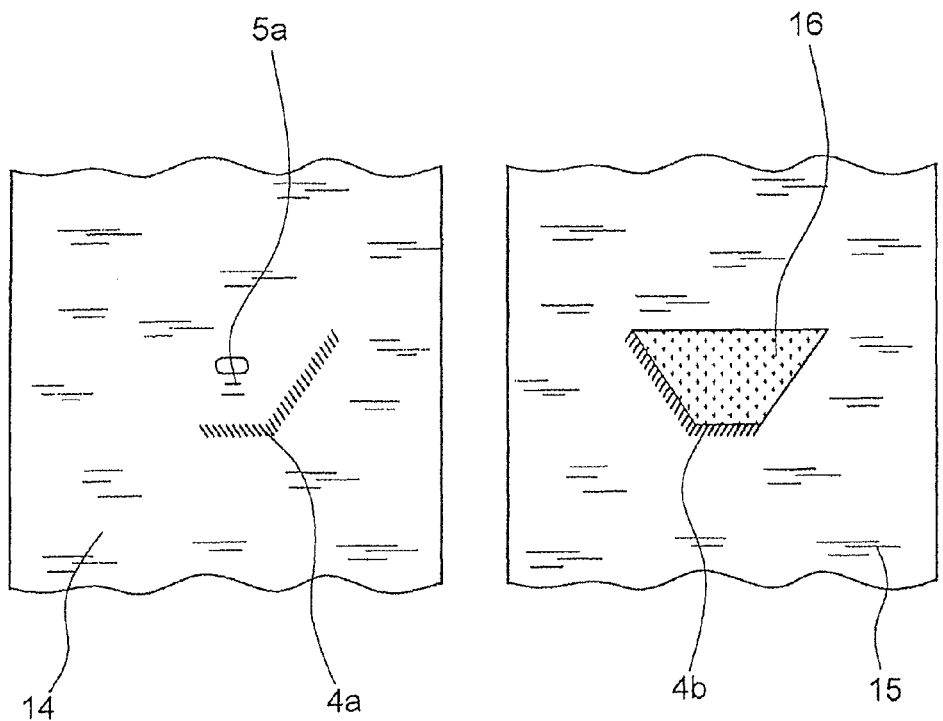
FIG. 4 is an extract of the processing of a counterpunch roller for carrying out a preferred embodiment of the method according to the invention.
FIG. 5 is an extract of the processing of a punch roller for carrying out a preferred embodiment of the method according to the invention.

FIG. 4 shows an extract of the processing of a counter-punch roller 14, which stamps the filter inserts as a stamping roller—part of a pair of stamping rollers 6a, 7a. The surface of the shown counterpunch roller 14 combines the functional abilities of a first stamping roller 6 with which the stamped seam 4 is stamped and the functional ability of a second stamping roller 7, with which the label 5 is stamped in that the stamped seam 4 and the label 5 are stamped with a single pair of stamping rollers or with a single stamping roller in one working step. For this, the surface of the counterpunch roller 14 according to FIG. 4 has projections 4a for stamping the stamped seam 4 as well as projections 5a for stamping the label 5.

In FIG. 5, an extract of the processing of a punch roller 15 is shown, which shows the supplementation of the counter punch roller 14 according to FIG. 4 into a pair of stamping rollers. The surface of the punch roller 15 has projections and recesses 4b, here, which correspond to the projections 4a of the counterpunch roller 14, so that a binding stamp results with a firm stamped seam. Furthermore, the surface of the punch roller 15 has a surface section 16 in which the surface, for example, is made of silicone or natural rubber. This elastic surface section 16 makes it possible that the projections 5a of the counterpunch roller 14 make a label stamp in the filter insert, wherein the elasticity of the surface section 16 prevents that both layers of the filter insert are bound to one another by the stamped label.

What is claimed is:

1. Method for producing filter inserts comprising the steps of:
   continuously folding a filter paper sheet into a double layer,
   partially binding the double layer into a plurality of interconnected filter inserts using at least one stamped seam, and
   separating the interconnected filter inserts from the filter paper sheet, and
   stamping the filter inserts with an elastic punch and a counterpunch, the counterpunch producing a label stamped into the filter inserts and the elastic punch acting to prevent the double layer of the folded filter paper sheet from being bound to one another by the label stamped into the filter inserts,
   wherein labeling of the filter insert occurs simultaneously with the separation of the filter insert from the filter paper sheet.

2. Method according to claim 1, wherein the label is stamped onto the filter insert comprises at least one of characters and a symbol.

3. Method according to claim 1, wherein the label is stamped onto the filter insert comprises a fill level indicator.

4. Method according to claim 1, wherein the filter paper sheet is initially continuously folded into a double layer, the double layer is bound together by stamping with at least one stamped seam partially into a plurality of interconnected filter inserts with the filter inserts subsequently being provided with the label by stamping.

5. Method according to claim 1, wherein the stamping of the stamped seam is performed using at least one stamping roller.

6. Method according to claim 1, wherein the separating of the filter inserts from the filter paper sheet is produced with a cutting roller or a pair of cutting rollers.

7. Method according to claim 1, wherein the folding into a double layer is produced by leading the filter paper sheet over a folding triangle.

8. Method according to claim 1, wherein the filter paper sheet is led by at least one converging roller or converging rod after folding and is turned by means of a deflection roller.

9. Method according to claim 1, wherein the punch comprises a roller having an elastic section formed of silicon rubber, natural rubber or wood.

10. Method for producing filter inserts comprising the steps of:
    continuously folding a filter paper sheet into a double layer,
    partially binding the double layer into a plurality of interconnected filter inserts using at least one stamped seam, and
    separating the interconnected filter inserts from the filter paper sheet, and
    stamping the filter inserts with a punch and elastic counterpunch, the punch producing a label stamped into the filter inserts and the elastic counterpunch acting to prevent the double layer of the folded filter paper sheet from being bound to one another by the label stamped into the filter inserts,
    wherein the stamping of the label reaches both layers of the double layer so that a part of the label is arranged on both sides of the filter insert,
    wherein the stamping of the stamped seam of both layers of the filter and stamping of the label occur in one step with a single stamping roller or pair of stamping rollers.

* * * * *